(12) United States Patent
You (10) Patent No.: US 7,947,097 B2
(45) Date of Patent: May 24, 2011

(54) LOW CORROSION ABRASIVE ARTICLES AND METHODS FOR FORMING SAME

(75) Inventor: Xiaorong You, Shrewsbury, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 746 days.

(21) Appl. No.: 11/962,013

(22) Filed: Dec. 20, 2007

(65) Prior Publication Data

US 2008/0148650 A1 Jun. 26, 2008

Related U.S. Application Data

(60) Provisional application No. 60/871,367, filed on Dec. 21, 2006.

(51) Int. Cl.
  *B24D 3/00* (2006.01)
  *B24D 11/00* (2006.01)
  *B24D 3/02* (2006.01)
  *B24B 1/00* (2006.01)
  *C09K 3/14* (2006.01)
  *C09C 1/68* (2006.01)

(52) U.S. Cl. ............... 51/298; 51/293; 51/295; 51/297; 51/307; 51/309; 427/203

(58) Field of Classification Search ............ 51/293, 51/295, 297, 298, 307, 309; 427/203
See application file for complete search history.

(56) References Cited

U.S. PATENT DOCUMENTS

| | | |
|---|---|---|
| 3,708,296 A | 1/1973 | Schlesinger |
| 4,250,053 A | 2/1981 | Smith |
| 4,256,828 A | 3/1981 | Smith |
| 4,751,102 A | 6/1988 | Adair et al. |
| 4,772,530 A | 9/1988 | Gottschalk et al. |
| 4,772,541 A | 9/1988 | Gottschalk et al. |
| 5,002,856 A | 3/1991 | Anderson |
| 5,059,701 A | 10/1991 | Keipert |
| 5,108,463 A | 4/1992 | Buchanan |
| 5,126,394 A | 6/1992 | Revis et al. |
| 5,137,542 A | 8/1992 | Buchanan et al. |
| 5,191,101 A | 3/1993 | Palazzotto et al. |
| 5,252,694 A | 10/1993 | Willett et al. |
| 5,328,716 A | 7/1994 | Buchanan |
| 5,359,017 A * | 10/1994 | Hamazu et al. ............ 526/211 |
| 5,417,726 A | 5/1995 | Stout et al. |
| 5,439,766 A * | 8/1995 | Day et al. ............ 430/18 |
| 5,505,747 A | 4/1996 | Chesley et al. |
| 5,549,719 A * | 8/1996 | Lee et al. ............ 51/298 |
| 5,556,437 A | 9/1996 | Lee et al. |
| 5,560,753 A | 10/1996 | Schnabel et al. |
| 5,565,011 A | 10/1996 | Follett et al. |
| 5,573,619 A | 11/1996 | Benedict et al. |
| 5,573,816 A | 11/1996 | Gaeta et al. |
| 5,868,806 A | 2/1999 | Nishio et al. |
| 6,120,878 A | 9/2000 | Follensbee et al. |
| 6,258,138 B1 | 7/2001 | DeVoe et al. |
| 6,432,549 B1 | 8/2002 | Kronzer |
| 6,467,897 B1 | 10/2002 | Wu et al. |
| 6,657,001 B1 | 12/2003 | Anderson et al. |
| 6,660,828 B2 | 12/2003 | Thomas et al. |
| 6,773,474 B2 | 8/2004 | Koehnle et al. |
| 6,797,023 B2 | 9/2004 | Knapp et al. |
| 6,905,772 B2 | 6/2005 | Shoup et al. |
| 6,929,539 B2 | 8/2005 | Schutz et al. |
| 7,022,801 B2 | 4/2006 | Medsker |
| 7,087,710 B2 | 8/2006 | Medsker et al. |
| 2003/0049995 A1 | 3/2003 | Schutz et al. |
| 2003/0109662 A1 | 6/2003 | Medsker et al. |
| 2003/0143938 A1 | 7/2003 | Braunschweig et al. |
| 2004/0048957 A1 | 3/2004 | Medsker et al. |
| 2004/0152799 A1 | 8/2004 | Miller et al. |
| 2004/0242804 A1 | 12/2004 | Medsker et al. |
| 2005/0019574 A1 | 1/2005 | McCrary |
| 2005/0020190 A1 | 1/2005 | Schutz et al. |
| 2005/0025967 A1 | 2/2005 | Lawton et al. |
| 2005/0032469 A1 | 2/2005 | Duescher |
| 2005/0069714 A1 | 3/2005 | Hart et al. |
| 2005/0262773 A1 | 12/2005 | Schutz et al. |
| 2006/0148642 A1 | 7/2006 | Ryu et al. |
| 2006/0154082 A1 | 7/2006 | Miller et al. |
| 2006/0234901 A1 | 10/2006 | Scheuing et al. |

FOREIGN PATENT DOCUMENTS

| | | |
|---|---|---|
| EP | 0035969 A1 | 9/1981 |
| EP | 0044274 A2 | 1/1982 |
| EP | 0054509 A2 | 6/1982 |
| EP | 0094914 A2 | 11/1983 |
| EP | 0094915 A2 | 11/1983 |
| EP | 0153904 A2 | 9/1985 |
| EP | 0164314 A2 | 12/1985 |
| EP | 0223587 A1 | 5/1987 |
| EP | 0546831 B1 | 6/1993 |
| EP | 1312655 A2 | 5/2003 |
| EP | 1487612 B1 | 4/2006 |
| WO | 9828663 A1 | 7/1998 |
| WO | 9851747 A1 | 11/1998 |
| WO | 0037569 A1 | 6/2000 |
| WO | 0109260 A1 | 2/2001 |
| WO | 0234848 A1 | 5/2002 |
| WO | 02092660 A2 | 11/2002 |
| WO | 2004013231 A2 | 2/2004 |
| WO | 2004067599 A1 | 8/2004 |
| WO | 2005005506 A1 | 1/2005 |
| WO | 2005026229 A1 | 3/2005 |
| WO | 2005035200 A | 4/2005 |
| WO | 2005047358 A1 | 5/2005 |
| WO | 2006043072 A1 | 4/2006 |
| WO | 2006065411 A1 | 6/2006 |
| WO | 2006069179 A2 | 6/2006 |
| WO | 2006083688 A1 | 8/2006 |
| WO | 2006091520 A1 | 8/2006 |

* cited by examiner

*Primary Examiner* — Anthony J Green
*Assistant Examiner* — Pegah Parvini
(74) *Attorney, Agent, or Firm* — Abel Law Group, LLP; Joseph P. Sullivan

(57) ABSTRACT

An abrasive article includes a binder and abrasive grains. The binder is formed from a formulation including a polymer component, a curing agent, and an acid bonding agent.

19 Claims, 2 Drawing Sheets

LOW CORROSION ABRASIVE ARTICLES AND METHODS FOR FORMING SAME

CROSS-REFERENCE TO RELATED APPLICATION(S)

The present application claims priority from U.S. Provisional Patent Application No. 60/871,367, filed Dec. 21, 2006, entitled "LOW CORROSION ABRASIVE ARTICLES AND METHODS FOR FORMING SAME," naming inventor Xiaorong You, which application is incorporated by reference herein in its entirety.

FIELD OF THE DISCLOSURE

This disclosure, in general, relates to low corrosion abrasive articles and methods for forming such low corrosion abrasive articles.

BACKGROUND

Abrasive articles, such as coated abrasives and bonded abrasives, are used in various industries to machine work pieces, such as by lapping, branding, or polishing. Machining utilizing abrasive articles spans a wide industrial scope from optics industries, automotive paint repair industries, to metal fabrication industries. In each of these examples, manufacturing facilities use abrasives to remove bulk material or affect surface characteristics of products.

Typical abrasive articles, such as coated abrasive articles and bonded abrasive articles, generally include a binder and abrasive grains. The binder is often formed of a polymer component and is typically cured during the manufacturing process. In particular binder formulations, the curing processes causes the release of corrosive byproducts or agents. Such corrosive byproducts or agents damage equipment associated with the manufacturing process. For example, in the case of a bonded abrasive article, a mold may be formed of a metallic material, or in the case of a coated abrasive product, the coated abrasive may be formed by casting a binder over a backing using metallic blades. Such metallic equipment may corrode when exposed to the corrosive byproducts or agents, leading to reduced equipment lifetime.

In addition to a reduction in equipment life, the corrosion may result in contamination of the abrasive article itself. For example, corroded materials may contaminate the abrasive article, altering the coloring of the article or the properties of the binder system. Further, such corroded materials may influence the performance of the abrasive article. In particular, corroded materials or the corrosive byproducts in an abrasive article may result in corrosion of work pieces abraded by such an abrasive article.

As such, an improved abrasive article and method for manufacturing such an abrasive article would be desirable.

SUMMARY

In a particular embodiment, an abrasive article includes a binder and abrasive grains. The binder is formed from a formulation including a polymer component, a curing agent, and an acid bonding agent.

In another embodiment, an abrasive article includes a binder and abrasive grains. The binder is formed from a formulation including a cationically polymerizable component, a cationic catalytic agent, and an acid bonding agent.

In a further embodiment, a method of forming an abrasive article includes preparing a formulation including a cationically polymerizable component, a cationic catalytic agent, and an acid bonding agent, forming the abrasive article including the formulation and abrasive grains, and curing the formulation.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

In a particular embodiment, an abrasive article includes a binder and abrasive grains. The binder is formed from a coating formulation that includes a polymerizable component and an acid bonding agent. The coating formulation also may include a curing agent, such as a cationic photoinitiator. In an exemplary embodiment, the polymerizable component is a cationic polymerizable component, such as an epoxy or an oxetane component. In a particular embodiment, the acid bonding agent includes a fluorinated polyether.

In another exemplary embodiment, a method of forming an abrasive article includes providing a coating formulation, forming the abrasive article including the coating formulation and abrasive grains, and curing the coating formulation. The coating formulation may include a polymerizable component and an acid bonding agent. In addition, the coating formulation may include a curing agent.

In an exemplary embodiment, a coating formulation is cured to form a binder or coating. The binder or coating may be used as part of a back size layer, compliant layer, make coat, size coat, supersize coat, or any combination thereof. In an example, the coating formulation includes a polymerizable component and an acid bonding agent. In addition, the coating formulation may include a curing agent, such as a catalytic agent or a photoinitiator. Further, the coating formulation may include defoamers, leveling agents, or other additives or fillers, or any combination thereof.

The coating formulation may include one or more reaction constituents or polymer constituents for the preparation of a polymer. A polymer constituent may include a monomeric molecule, a polymeric molecule, or a combination thereof. The coating formulation or the backsize formulation may further include components selected from the group consisting of solvents, plasticizers, chain transfer agents, catalysts, stabilizers, dispersants, curing agents, reaction mediators, or agents for influencing the fluidity of the dispersion.

The polymer constituents can form thermoplastics or thermosets. By way of example, the polymer constituents may include monomers and resins for the formation of polyurethane, polyurea, polymerized epoxy, polyester, polyimide, polysiloxanes (silicones), polymerized alkyd, styrene-butadiene rubber, acrylonitrile-butadiene rubber, polybutadiene, or, in general, reactive resins for the production of thermoset polymers. Another example includes an acrylate or a methacrylate polymer constituent. The precursor polymer constituents are typically polymerizable organic material (i.e., a polymer monomer or material capable of polymerizing or crosslinking upon exposure to heat or other sources of energy, such as electron beam, ultraviolet light, visible light, etc., or with time upon the addition of a chemical catalyst, moisture, or other agent which cause the polymer to cure or polymerize). A precursor polymer constituent example includes a reactive constituent for the formation of an amino polymer or an aminoplast polymer, such as alkylated urea-formaldehyde polymer, melamine-formaldehyde polymer, and alkylated benzoguanamine-formaldehyde polymer; acrylate polymer including acrylate and methacrylate polymer, alkyl acrylate, acrylated epoxy, acrylated urethane, acrylated polyester, acrylated polyether, vinyl ether, acrylated oil, or acrylated silicone; alkyd polymer such as urethane alkyd polymer; polyester polymer; reactive urethane polymer; phenolic polymer such as resole and novolac polymer; phenolic/latex polymer; epoxy polymer such as bisphenol epoxy polymer; isocyanate; isocyanurate; polysiloxane polymer including alkylalkoxysilane polymer; or reactive vinyl polymer. The coating formulation may include a monomer, an oligomer, a polymer, or a combination thereof. In a particular embodiment, the coating formulation includes monomers of at least two types of polymers that when cured may crosslink. For example, the coating formulation may include epoxy constituents and acrylic constituents that when cured form an epoxy/acrylic polymer.

In an exemplary embodiment, the polymer reaction components include anionically or cationically polymerizable components. For example, the coating formulation may include at least one cationically polymerizable component, e.g., at least one cyclic ether component, cyclic lactone component, cyclic acetal component, cyclic thioether component, spiro orthoester component, epoxy-functional component, or oxetane-functional component. Typically, the coating formulation includes at least one component selected from the group consisting of an epoxy-functional component and an oxetane-functional component. The coating formulation may include, relative to the total weight of the coating formulation, at least about 10.0 wt % of a cationically polymerizable component, for example, at least about 20.0 wt %, typically, at least about 40.0 wt %, or at least about 50.0 wt % of the cationically polymerizable component. Generally, the coating formulation includes, relative to the total weight of the coating formulation, not greater than about 95.0 wt % of a cationically polymerizable component, for example, not greater than about 90.0 wt %, not greater than about 80.0 wt %, or not greater than about 70.0 wt % of the cationically polymerizable component. In general, the amounts of components are expressed as weight % of the component relative to the total weight of the coating formulation, unless explicitly stated otherwise.

The coating formulation may include at least one epoxy-functional component, e.g., an aromatic epoxy-functional component ("aromatic epoxy") or an aliphatic epoxy-functional component ("aliphatic epoxy"). Epoxy-functional components are components comprising one or more epoxy groups, i.e., one or more three-member ring structures (oxiranes).

Aromatic epoxies components include one or more epoxy groups and one or more aromatic rings. The coating formulation may include one or more aromatic epoxy components. An example of an aromatic epoxy component includes an aromatic epoxy derived from a polyphenol, e.g., from bisphenols, such as bisphenol A (4,4'-isopropylidenediphenol), bisphenol F (bis[4-hydroxyphenyl]methane), bisphenol S (4,4'-sulfonyldiphenol), 4,4'-cyclohexylidenebisphenol, 4,4'-biphenol, or 4,4'-(9-fluorenylidene)diphenol. The bisphenol may be alkoxylated (e.g., ethoxylated or propoxylated) or halogenated (e.g., brominated). Examples of bisphenol epoxies include bisphenol diglycidyl ethers, such as diglycidyl ether of Bisphenol A or Bisphenol F.

A further example of an aromatic epoxy includes triphenylolmethane triglycidyl ether, 1,1,1-tris(p-hydroxyphenyl)ethane triglycidyl ether, or an aromatic epoxy derived from a monophenol, e.g., from resorcinol (for example, resorcin diglycidyl ether) or hydroquinone (for example, hydroquinone diglycidyl ether). Another example is nonylphenyl glycidyl ether.

In addition, an example of an aromatic epoxy includes epoxy novolac, for example, phenol epoxy novolac and cresol epoxy novolac. A commercial example of a cresol epoxy novolac includes, for example, EPICLON N-660, N-665, N-667, N-670, N-673, N-680, N-690, or N-695, manufactured by Dainippon Ink and Chemicals, Inc. An example of a phenol epoxy novolac includes, for example, EPICLON N-740, N-770, N-775, or N-865, manufactured by Dainippon Ink and Chemicals Inc.

In one embodiment, the coating formulation may contain, relative to the total weight of the coating formulation, at least about 10.0 wt % of one or more aromatic epoxies.

Aliphatic epoxy components have one or more epoxy groups and are free of aromatic rings. The coating formulation may include one or more aliphatic epoxies. An example of an aliphatic epoxy includes glycidyl ether of C2-C30 alkyl; 1,2 epoxy of C3-C30 alkyl; mono or multi glycidyl ether of an aliphatic alcohol or polyol such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols; polyols; or any combination thereof.

In one embodiment, the aliphatic epoxy includes one or more cycloaliphatic ring structures. For example, the aliphatic epoxy may have one or more cyclohexene oxide structures, for example, two cyclohexene oxide structures. An example of an aliphatic epoxy comprising a ring structure includes hydrogenated bisphenol A diglycidyl ether, hydrogenated bisphenol F diglycidyl ether, hydrogenated bisphenol S diglycidyl ether, bis(4-hydroxycyclohexyl)methane diglycidyl ether, 2,2-bis(4-hydroxycyclohexyl)propane diglycidyl ether, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, di(3,4-epoxycyclohexylmethyl)hexanedioate, di(3,4-epoxy-6-methylcyclohexylmethyl)hexanedioate, ethylenebis(3,4-epoxycyclohexanecarboxylate), ethanedioldi(3,4-epoxycyclohexylmethyl)ether, 2-(3,4-epoxycyclohexyl-5,5-spiro-3,4-epoxy)cyclohexane-1,3-dioxane, or any combination thereof. An example of an aliphatic epoxy is also listed in U.S. Pat. No. 6,410,127, which is hereby incorporated in its entirety by reference.

In an embodiment, the coating formulation includes, relative to the total weight of the coating formulation, at least about 5.0 wt % of one or more aliphatic epoxies, for example, at least about 10.0 wt %, or at least about 20.0 wt % of the aliphatic epoxy. Generally, the coating formulation includes, relative to the total weight of the coating formulation, not greater than about 70.0 wt % of the aliphatic epoxy, for example, not greater than about 50.0 wt %, or even not greater than about 40.0 wt % of the aliphatic epoxy.

Typically, the coating formulation includes one or more mono or poly glycidylethers of aliphatic alcohols, aliphatic polyols, polyesterpolyols, polyetherpolyols, or any combination thereof. An example of such a component includes 1,4-butanedioldiglycidylether, glycidylether of polyoxyethylene or polyoxypropylene glycol or triol of molecular weight from about 200 to about 10,000; glycidylether of polytetramethylene glycol or poly(oxyethylene-oxybutylene) random or block copolymers. An example of commercially available glycidylether includes a polyfunctional glycidylether, such as Heloxy 48, Heloxy 67, Heloxy 68, Heloxy 107, and Grilonit F713; or monofunctional glycidylethers, such as Heloxy 71, Heloxy 505, Heloxy 7, Heloxy 8, or Heloxy 61 (sold by Resolution Performances).

The coating formulation may contain about 3.0 wt % to about 40.0 wt %, or more typically about 5.0 wt % to about 20.0 wt % of mono or poly glycidyl ether of an aliphatic alcohol, aliphatic polyols, polyesterpolyol or polyetherpolyol.

The coating formulation may include one or more oxetane-functional components ("oxetanes"). Oxetanes are components having one or more oxetane groups, i.e., one or more four-member ring structures including one oxygen and three carbon members.

Examples of oxetanes include components represented by the following formula:

wherein

Q1 represents a hydrogen atom, an alkyl group having 1 to 6 carbon atoms (such as a methyl, ethyl, propyl, or butyl group), a fluoroalkyl group having 1 to 6 carbon atoms, an allyl group, an aryl group, a furyl group, or a thienyl group;

Q2 represents an alkylene group having 1 to 6 carbon atoms (such as a methylene, ethylene, propylene, or butylene group), or an alkylene group containing an ether linkage, for example, an oxyalkylene group, such as an oxyethylene, oxypropylene, or oxybutylene group Z represents an oxygen atom or a sulfur atom; and R2 represents a hydrogen atom, an alkyl group having 1-6 carbon atoms (e.g., a methyl group, ethyl group, propyl group, or butyl group), an alkenyl group having 2-6 carbon atoms (e.g., a 1-propenyl group, 2-propenyl group, 2-methyl-1-propenyl group, 2-methyl-2-propenyl group, 1-butenyl group, 2-butenyl group, or 3-butenyl group), an aryl group having 6-18 carbon atoms (e.g., a phenyl group, naphthyl group, anthranyl group, or phenanthryl group), a substituted or unsubstituted aralkyl group having 7-18 carbon atoms (e.g., a benzyl group, fluorobenzyl group, methoxy benzyl group, phenethyl group, styryl group, cynnamyl group, ethoxybenzyl group), an aryloxyalkyl group (e.g., a phenoxymethyl group or phenoxyethyl group), an alkylcarbonyl group having 2-6 carbon atoms (e.g., an ethylcarbonyl group, propylcarbonyl group, or butylcarbonyl group), an alkoxy carbonyl group having 2-6 carbon atoms (e.g., an ethoxycarbonyl group, propoxycarbonyl group, or butoxycarbonyl group), an N-alkylcarbamoyl group having 2-6 carbon atoms (e.g., an ethylcarbamoyl group, propylcarbamoyl group, butylcarbamoyl group, or pentylcarbamoyl group), or a polyether group having 2-1000 carbon atoms. One particularly useful oxetane includes 3-ethyl-3-(2-ethylhexyloxymethyl) oxetane.

In addition to or instead of one or more cationically polymerizable components, the coating formulation may include one or more free radical polymerizable components, e.g., one or more free radical polymerizable components having one or more ethylenically unsaturated groups, such as (meth)acrylate (i.e., acrylate or methacrylate) functional components.

An example of a monofunctional ethylenically unsaturated component includes acrylamide, N,N-dimethylacrylamide, (meth)acryloylmorpholine, 7-amino-3,7-dimethyloctyl (meth)acrylate, isobutoxymethyl(meth)acrylamide, isobornyloxyethyl (meth)acrylate, isobornyl (meth)acrylate, 2-ethylhexyl (meth)acrylate, ethyldiethylene glycol (meth) acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl(meth)acrylamidetetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinylcaprolactam, N-vinylpyrrolidone, phenoxyethyl (meth)acrylate, butoxyethyl (meth)acrylate, pentachlorophenyl (meth)acrylate, pentabromophenyl (meth)acrylate, polyethylene glycol mono(meth) acrylate, polypropylene glycol mono(meth)acrylate, bornyl (meth)acrylate, methyltriethylene diglycol (meth)acrylate, or any combination thereof.

An example of the polyfunctional ethylenically unsaturated component includes ethylene glycol di(meth)acrylate, dicyclopentenyl di(meth)acrylate, triethylene glycol diacrylate, tetraethylene glycol di(meth)acrylate, tricyclodecanediyldimethylene di(meth)acrylate, trimethylolpropane tri(meth)acrylate, ethoxylated trimethylolpropane tri(meth) acrylate, propoxylated trimethylolpropane tri(meth)acrylate, tripropylene glycol di(meth)acrylate, neopentyl glycol di(meth)acrylate, both-terminal (meth)acrylic acid adduct of bisphenol A diglycidyl ether, 1,4-butanediol di(meth)acrylate, 1,6-hexanediol di(meth)acrylate, polyethylene glycol di(meth)acrylate, (meth)acrylate-functional pentaerythritol derivatives (e.g., pentaerythritol tri(meth)acrylate, pentaerythritol tetra(meth)acrylate, dipentaerythritol hexa(meth) acrylate, dipentaerythritol penta(meth)acrylate, or dipentaerythritol tetra(meth)acrylate), ditrimethylolpropane tetra (meth)acrylate, ethoxylated bisphenol A di(meth)acrylate, propoxylated bisphenol A di(meth)acrylate, ethoxylated hydrogenated bisphenol A di(meth)acrylate, propoxylated-modified hydrogenated bisphenol A di(meth)acrylate, ethoxylated bisphenol F di(meth)acrylate, or any combination thereof.

In an embodiment, the coating formulation comprises one or more components having at least 3 (meth)acrylate groups, for example, 3 to 6 (meth)acrylate groups, or 5 to 6 (meth) acrylate groups.

In particular embodiments, the coating formulation includes, relative to the total weight of the coating formulation, at least about 3.0 wt % of one or more free radical polymerizable component, for example, at least about 5.0 wt %, or at least about 9.0 wt %. Generally, the coating formulation includes not greater than about 50.0 wt % of a free radical polymerizable component, for example, not greater than about 35.0 wt %, not greater than about 25.0 wt %, not greater than about 20.0 wt %, or even not greater than about 15.0 wt % of the free radical polymerizable component.

Generally, the polymer reaction constituents or precursors have on average at least two functional groups, such as on average at least 2.5 or at least 3.0 functional groups. For example, an epoxy precursor may have 2 or more epoxy-functional groups. In another example, an acrylic precursor may have two or more methacrylate functional groups.

It has surprisingly been found that a coating formulation including a component having a polyether backbone shows excellent mechanical properties after cure of the coating formulation. An example of a compound having a polyether backbone includes polytetramethylenediol, a glycidylether of polytetramethylenediol, an acrylate of polytetramethylenediol, a polytetramethylenediol containing one or more polycarbonate groups, or any combination thereof. In an embodiment, the coating formulation includes between 5.0 wt % and 20.0 wt % of a compound having a polyether backbone.

The coating formulation also may include a curing agent, such as a catalyst or a initiator. For example, the curing agent may include a cationic catalytic agent, such as a cationic initiator. In an example, a cationic initiator may catalyze reactions between cationic polymerizable components. In another example, the curing agent may include a radical initiator that may activate free-radical polymerization of radically polymerizable components. The initiator may be activated by thermal energy or actinic radiation. For example, an initiator may include a cationic photoinitiator that catalyzes cationic polymerization reactions when exposed to actinic radiation. In another example, the initiator may include a radical photoinitiator that initiates free-radical polymerization reactions when exposed to actinic radiation. Actinic radiation includes particulate or non-particulate radiation and is intended to include electron beam radiation and electromagnetic radiation. In a particular embodiment, electromagnetic radiation includes radiation having at least one wavelength in the range of about 100 nm to about 700 nm and, in particular, wavelengths in the ultraviolet range of the electromagnetic spectrum.

Generally, cationic photoinitiators are materials that form active species that, if exposed to actinic radiation, are capable of at least partially polymerizing epoxides or oxetanes. For example, a cationic photoinitiator may, upon exposure to actinic radiation, form cations that can initiate the reactions of cationically polymerizable components, such as epoxies or oxetanes.

An example of a cationic photoinitiator includes, for example, onium salt with anions of weak nucleophilicity. An example of a cationic photoinitiator may include a halonium salt, an iodosyl salt, or a sulfonium salt, such as described in published European patent application EP 153904 and WO 98/28663, a sulfoxonium salt, such as described, for example, in published European patent applications EP 35969, 44274, 54509, and 164314, or a diazonium salt, such as described, for example, in U.S. Pat. Nos. 3,708,296 and 5,002,856. All eight of these disclosures are hereby incorporated in their entirety by reference. Other examples of cationic photoinitiators include metallocene salt, such as described, for example, in published European applications EP 94914 and 94915, which applications are both hereby incorporated in their entirety by reference.

In exemplary embodiments, the coating formulation includes one or more photoinitiators represented by the following formula (1) or (2):

(1)

(2)

wherein

Q3 represents a hydrogen atom, an alkyl group having 1 to 18 carbon atoms, or an alkoxyl group having 1 to 18 carbon atoms; M represents a metal atom, e.g., antimony; Z represents a halogen atom, e.g., fluorine; and t is the valent number of the metal, e.g., 5 in the case of antimony.

In particular examples, the coating formulation may include, relative to the total weight of the coating formulation, about 0.1 wt % to about 15.0 wt % of one or more cationic photoinitiators, for example, about 1.0 wt % to about 10.0 wt % of the one or more cationic photoinitiators.

Typically, an onium salt photoinitiator includes an iodonium complex salt or a sulfonium complex salt. Useful aromatic onium complex salts are further described, for example, in U.S. Pat. No. 4,256,828 (Smith), the disclosure of which is incorporated herein by reference. An exemplary aromatic iodonium complex salt includes a diaryliodonium hexafluorophosphate or a diaryliodonium hexafluoroantimonate. An exemplary aromatic sulfonium complex salt includes a triphenylsulfonium hexafluoroantimonate p-phenyl(thiophenyl)diphenylsulfonium hexafluoroantimonate, or a sulfonium (thiodi-4,1-phenylene)bis(diphenyl-bis((OC-6-11)hexafluoroantimonate)).

Aromatic onium salts are typically photosensitive in the ultraviolet region of the spectrum. However, they can be sensitized to the near ultraviolet and the visible range of the spectrum by sensitizers for known photolyzable organic halogen compounds. An exemplary sensitizer includes an aromatic amine or a colored aromatic polycyclic hydrocarbon, as described, for example, in U.S. Pat. No. 4,250,053 (Smith), the disclosure of which is incorporated herein by reference.

A suitable photoactivatable organometallic complex salt includes those described, for example, in U.S. Pat. Nos. 5,059,701 (Keipert); 5,191,101 (Palazzotto et al.); and 5,252,694 (Willett et al.), the disclosures of which are incorporated herein by reference. An exemplary organometallic complex salt useful as photoactivatable initiators includes ($\tau^6$-benzene)($\tau^5$-cyclopentadienyl)Fe$^{+1}$SbF$_6^-$, ($\tau^6$-toluene)($\tau^5$-cyclopentadienyl)Fe$^{+1}$ AsF$_6^-$, ($\eta^6$-xylene)($\eta^5$-cyclopentadienyl)Fe$^{+1}$SbF$_6^-$, ($\tau^6$-cumene)($\eta^5$-cyclopentadienyl)Fe$^{+1}$ PF$_6^-$, ($\tau^6$-xylenes (mixed isomers))($\eta^5$-cyclopentadienyl)-Fe$^{+1}$SbF$_6^-$, ($\tau^6$-xylenes (mixed isomers))($\eta^5$-cyclopentadienyl)Fe$^{-1}$PF$_6^-$, ($\tau^6$-o-xylene)($\eta^5$-cyclopentadienyl)Fe$^{+1}$CF$_3$SO$_3^-$, ($\eta^6$m-xylene)($\eta^5$-cyclopentadienyl)Fe$^{+1}$BF$_4^-$, ($\eta^6$-mesitylene)($\eta^5$-cyclopentadienyl)Fe$^{+1}$SbF$_6^-$, ($\tau^6$-hexamethylbenzene)($\eta^5$-cyclopentadienyl)Fe$^{+1}$SbF$_5$OH$^-$, ($\tau^6$-fluorene)($\eta^5$-cyclopentadienyl)Fe$^{+1}$SbF$_6^-$, or any combination thereof.

Optionally, organometallic salt catalysts can be accompanied by an accelerator, such as an oxalate ester of a tertiary alcohol. If present, the accelerator desirably comprises from about 0.1% to about 4.0% by weight of the total coating formulation.

A useful commercially available cationic photoinitiator includes an aromatic sulfonium complex salt, available, for example, under the trade designation "FX-512" from Minnesota Mining and Manufacturing Company, St. Paul, Minn., an aromatic sulfonium complex salt having the trade designation "UVI-6974", available from Dow Chemical Co., or Chivacure 1176.

The coating formulation may optionally include photoinitiators useful for photocuring free-radically polyfunctional acrylates. An example of a free radical photoinitiator includes benzophenone (e.g., benzophenone, alkyl-substituted benzophenone, or alkoxy-substituted benzophenone); benzoin (e.g., benzoin, benzoin ethers, such as benzoin methyl ether, benzoin ethyl ether, and benzoin isopropyl ether, benzoin phenyl ether, and benzoin acetate); acetophenone, such as acetophenone, 2,2-dimethoxyacetophenone, 4-(phenylthio) acetophenone, and 1,1-dichloroacetophenone; benzil ketal, such as benzil dimethyl ketal, and benzil diethyl ketal; anthraquinone, such as 2-methylanthraquinone, 2-ethylanthraquinone, 2-tertbutylanthraquinone, 1-chloroanthraquinone, and 2-amylanthraquinone; triphenylphosphine; benzoylphosphine oxides, such as, for example, 2,4,6-trimethylbenzoyldiphenylphosphine oxide; thioxanthone or xanthone; acridine derivative; phenazene derivative; quinoxaline derivative; 1-phenyl-1,2-propanedione-2-O-benzoyloxime; 1-aminophenyl ketone or 1-hydroxyphenyl ketone, such as 1-hydroxycyclohexyl phenyl ketone, phenyl (1-hydroxyisopropyl)ketone and 4-isopropylphenyl(1-hydroxyisopropyl) ketone; or a triazine compound, for example, 4'''-methyl thiophenyl-1-di(trichloromethyl)-3,5-S-triazine, S-triazine-2-(stilbene)-4,6-bistrichloromethyl, paramethoxy styryl triazine, or any combination thereof.

An exemplary photoinitiator includes benzoin or its derivative such as α-methylbenzoin; U-phenylbenzoin; α-allylbenzoin; α-benzylbenzoin; benzoin ethers such as benzil dimethyl ketal (available, for example, under the trade designation "IRGACURE 651" from Ciba Specialty Chemicals), benzoin methyl ether, benzoin ethyl ether, benzoin n-butyl ether; acetophenone or its derivative, such as 2-hydroxy-2-methyl-1-phenyl-1-propanone (available, for example, under the trade designation "DAROCUR 1173" from Ciba Specialty Chemicals) and 1-hydroxycyclohexyl phenyl ketone (available, for example, under the trade designation "IRGACURE 184" from Ciba Specialty Chemicals); 2-methyl-1-[4-(methylthio)phenyl]-2-(4-morpholinyl)-1-propanone (available, for example, under the trade designation "IRGACURE 907" from Ciba Specialty Chemicals); 2-benzyl-2-(dimethlamino)-1-[4-(4-morpholinyl)phenyl]-1-butanone (available, for example, under the trade designation "IRGACURE 369" from Ciba Specialty Chemicals); or any blend thereof.

Another useful photoinitiator includes pivaloin ethyl ether, anisoin ethyl ether; anthraquinones, such as anthraquinone, 2-ethylanthraquinone, 1-chloroanthraquinone, 1,4-dimethylanthraquinone, 1-methoxyanthraquinone, benzanthraquinonehalomethyltriazines, or the like; benzophenone or its derivative; iodonium salt or sulfonium salt as described hereinabove; a titanium complex such as bis(τ5-2,4-cyclopentadienyl)bis[2,-6-difluoro-3-(1H-pyrrolyl)phenyl)titanium (commercially available under the trade designation "CGI784DC", also from Ciba Specialty Chemicals); a halomethylnitrobenzene such as 4-bromomethylnitrobenzene or the like; or mono- or bis-acylphosphine (available, for example, from Ciba Specialty Chemicals under the trade designations "IRGACURE 1700", "IRGACURE 1800", "IRGACURE 1850", and "DAROCUR 4265"). A suitable photoinitiator may include a blend of the above mentioned species, such as α-hydroxy ketone/acrylphosphin oxide blend (available, for example, under the trade designation IRGACURE 2022 from Ciba Specialty Chemicals.)

A further suitable free radical photoinitiator includes an ionic dye-counter ion compound, which is capable of absorbing actinic rays and producing free radicals, which can initiate the polymerization of the acrylates. See, for example, published European Patent Application 223587, and U.S. Pat. Nos. 4,751,102, 4,772,530 and 4,772,541, all four of which are hereby incorporated in their entirety by reference.

A photoinitiator can be present in an amount not greater than about 20.0 wt %, for example, not greater than about 10.0 wt %, and typically not greater than about 5.0 wt %, based on the total weight of the coating formulation. For example, a photoinitiator may be present in an amount of 0.1 wt % to 20.0 wt %, such as 0.1 wt % to 5.0 wt %, or most typically 0.1 wt % to 2.0 wt %, based on the total weight of the coating formulation, although amounts outside of these ranges may also be useful. In one example, the photoinitiator is present in an amount at least about 0.1 wt %, such as at least about 1.0 wt %, or in an amount of about 1.0 wt % to about 10.0 wt %.

Optionally, a thermal curative may be included in the coating formulation. Such a thermal curative is generally thermally stable at temperatures at which mixing of the components takes place. Exemplary thermal curatives for epoxy resins and acrylates are well known in the art, and are described, for example, in U.S. Pat. No. 6,258,138 (DeVoe et al.), the disclosure of which is incorporated herein by reference. A thermal curative may be present in a binder precursor in any effective amount. Such amounts are typically in the range of about 0.01 wt % to about 5.0 wt %, desirably in the range from about 0.025 wt % to about 2.0 wt % by weight, based upon the weight of the coating formulation, although amounts outside of these ranges may also be useful.

The coating formulation may also include other components such as solvents, plasticizers, crosslinkers, chain transfer agents, stabilizers, dispersants, curing agents, reaction mediators and agents for influencing the fluidity of the dispersion. For example, the coating formulation can also include one or more chain transfer agents selected from the group consisting of polyol, polyamine, linear or branched polyglycol ether, polyester and polylactone.

In another example, the coating formulation may include additional components, such as a hydroxy-functional or an amine functional component or additive. Generally, the particular hydroxy-functional component is absent curable groups (such as, for example, acrylate-, epoxy-, or oxetane groups) and are not selected from the group consisting of photoinitiators.

The coating formulation may include one or more hydroxy-functional components. A hydroxy-functional component may be helpful in further tailoring mechanical properties of the coating formulation upon cure. A hydroxy-functional component includes a monol (a hydroxy-functional component comprising one hydroxy group) or a polyol (a hydroxy-functional component comprising more than one hydroxy group).

A representative example of a hydroxy-functional component includes an alkanol, a monoalkyl ether of polyoxyalkyleneglycol, a monoalkyl ether of alkyleneglycol, alkylene and arylalkylene glycol, such as 1,2,4-butanetriol, 1,2,6-hexanetriol, 1,2,3-heptanetriol, 2,6-dimethyl-1,2,6-hexanetriol, (2R,3R)-(−)-2-benzyloxy-1,3,4-butanetriol, 1,2,3-hexanetriol, 1,2,3-butanetriol, 3-methyl-1,3,5-pentanetriol, 1,2,3-cyclohexanetriol, 1,3,5-cyclohexanetriol, 3,7,11,15-tetramethyl-1,2,3-hexadecanetriol, 2-hydroxymethyltetrahydropyran-3,4,5-triol, 2,2,4,4-tetramethyl-1,3-cyclobutanediol, 1,3-cyclopentanediol, trans-1,2-cyclooctanediol, 1,16-hexadecanediol, 3,6-dithia-1,8-octanediol, 2-butyne-1,4-diol, 1,2- or 1,3-propanediol, 1,2- or 1,4-butanediol, 1,5-pentanediol, 1,6-hexanediol, 1,7-heptanediol, 1,8-octanediol, 1,9-nonanediol, 1-phenyl-1,2-ethanediol, 1,2-cyclohexanediol, 1,5-decalindiol, 2,5-dimethyl-3-hexyne-2,5-diol, 2,2,4-trimethylpentane-1,3-diol, neopentylglycol, 2-ethyl-1,3-hexanediol, 2,7-dimethyl-3,5-octadiyne-2-7-diol, 2,3-butanediol, 1,4-cyclohexanedimethanol, polyoxyethylene or polyoxypropylene glycols or triols of molecular weights from about 200 to about 10,000, polytetramethylene glycols of varying molecular weight, poly(oxyethylene-oxybutylene) random or block copolymers, copolymers containing pendant hydroxy groups formed by hydrolysis or partial hydrolysis of vinyl acetate copolymers, polyvinylacetal resins containing pendant hydroxyl groups, hydroxy-functional (e.g., hydroxy-terminated) polyesters or hydroxy-functional (e.g., hydroxy-terminated) polylactones, aliphatic polycarbonate polyols (e.g., an aliphatic polycarbonate diol), hydroxy-functional (e.g., hydroxy-terminated) polyethers (e.g., polytetrahydrofuran polyols having a number average molecular weight in the range of 150-4000 g/mol, 150-1500 g/mol, or 150-750 g/mol), or any combination thereof. An exemplary polyol further includes aliphatic polyol, such as glycerol, trimethylolpropane, or also sugar alcohol, such as erythritol, xylitol, mannitol or sorbitol. In particular embodiments, the coating formulation includes one or more alicyclic polyols, such as 1,4-cyclohexane-dimethanol, sucrose, or 4,8-bis(hydroxymethyl)tricyclo(5,2,1,0)decane.

A suitable polyether for the coating formulation includes, in particular, linear or branched polyglycol ether obtainable by ring-opening polymerization of cyclic ether in the presence of polyol, e.g., the aforementioned polyol; polyglycol ether, polyethylene glycol, polypropylene glycol or polytetramethylene glycol or a copolymer thereof.

Another suitable polyester for the coating formulation includes a polyester based on polyols and aliphatic, cycloaliphatic or aromatic polyfunctional carboxylic acids (for example, dicarboxylic acids), or specifically all corresponding saturated polyesters which are liquid at temperatures of 18° C. to 300° C., typically 18° C. to 150° C.: typically succinic ester, glutaric ester, adipic ester, citric ester, phthalic ester, isophthalic ester, terephthalic ester or an ester of corresponding hydrogenation products, with the alcohol component being composed of monomeric or polymeric polyols, for example, of those of the above-mentioned kind.

A further polyester includes aliphatic polylactone, such as ε-polycaprolactone, or polycarbonate, which, for example, are obtainable by polycondensation of diol with phosgene. For the coating formulation, it is typical to use polycarbonate of bisphenol A having an average molecular weight of from 500 to 100,000.

For the purpose of influencing the viscosity of the coating formulation and, in particular, viscosity reduction or liquefaction, the polyol, polyether or saturated polyester or mixtures thereof, where appropriate, may be admixed with a further suitable auxiliary, particularly a solvent, a plasticizer, a diluent or the like. In an embodiment, the compositions may comprise, relative to the total weight of the coating formulation, not greater than about 15.0 wt %, such as not greater than about 10.0 wt %, not greater than about 6.0 wt %, not greater than about 4.0 wt %, not greater than about 2.0 wt %, or about 0.0 wt % of a hydroxy-functional component. In an example, the coating formulations are free of substantial amounts of a hydroxy-functional component. The absence of substantial amounts of hydroxy-functional components may decrease the hygroscopicity of the coating formulations or articles obtained therewith.

An example of a hydroxy or an amine functional organic compound for making condensation product with an alkylene oxide includes a polyol having 3 to 20 carbon atoms, a (C8-C18) fatty acid (C1-C8) alkanol amides like fatty acid ethanol amides, a fatty alcohol, an alkylphenol or a diamine having 2 to 5 carbon atoms. Such compounds are reacted with alkylene oxide, such as ethylene oxide, propylene oxide or any mixture thereof. The reaction may take place in a molar ratio of hydroxy or amine containing organic compound to alkyleneoxide of, for example, 1:2 to 1:65. The condensation product typically has a weight average molecular weight of about 500 to about 10,000, and may be branched, cyclic, linear, and either a homopolymer, a copolymer or a terpolymer.

In an exemplary embodiment, the coating formulation includes an acid bonding agent. For example, the coating formulation may include about 10 ppm to about 1.0 wt % of the acid bonding agent, such as about 10 ppm to about 1000 ppm. In particular, the coating formulation may include, by weight, about 10 ppm to about 500 ppm, such as about 10 ppm to about 250 ppm, or even about 50 ppm to about 155 ppm of the acid bonding agent.

In an embodiment, the acid bonding agent includes a fluorinated polyether. For example, the fluorinated polyether may be an acrylic terminated fluorinated polyether. In another example, the fluorinated polyether may be a hydroxyl-terminated polyether. Generally, the fluorinated polyether includes repeating units joined together by an ether bond. For example, the fluorinated polyether may include about 5 to about 25 repeating units, such as about 6 to about 20 repeating units. In an example, the fluorinated polyether includes 6 repeating units. In another example, the fluorinated polyether includes 20 repeating units. In addition, each repeating unit of the fluorinated polyether may include a fluorinated alkoxy group. In an example, the fluorinated alkoxy group includes about 1 to about 3 carbons. In particular, the fluorinated alkoxy group may be a fluorinated methyl, ethyl, or propyl group, or any combination thereof.

In a particular example, an exemplary acid bonding agent is available under the tradename PolyFox™ available from Omnova Solutions, Inc. of Akron, Ohio. In particular, an acid bonding agent may include PolyFox™ PF-636, PF-656, PF-6320, PF-6520, PF-3305, PF-3320, AT-1145, AT-1063, AT-1128, or any combination thereof, each available from Omnova Solution, Inc. of Akron, Ohio.

The coating formulation further may include a dispersant for interacting with and modifying the surface of the particulate filler. For example, a dispersant may include organosiloxane, functionalized organisiloxane, alkyl-substituted pyrrolidone, polyoxyalkylene ether, ethyleneoxide propyleneoxide copolymer, or any combination thereof. For various particulate fillers and, in particular, for silica filler, a suitable surface modifier includes siloxane. Alternatively, the coating formulation may be free of dispersant.

An example of siloxane includes functionalized or non-functionalized siloxane. An example of a siloxane includes a compound represented by the formula, wherein each R is independently a substituted or unsubstituted linear, branched or cyclic C1-10 alkyl, C1-10 alkoxy, substituted or unsubstituted aryl, aryloxy, trihaloalkyl, cyanoalkyl or vinyl group; wherein B1 or B2 is a hydrogen, siloxy group, vinyl, silanol, alkoxy, amine, epoxy, hydroxy, (meth)acrylate, mercapto or solvent phobic groups such as lipophilic or hydrophilic (e.g., anionic, cationic) groups; and wherein n is an integer from about 1 to about 10,000, particularly from about 1 to about 100.

In general, the functionalized siloxane is a compound having a molecular weight ranging from about 300 to about 20,000. Such compounds are commercially available, for example, from the General Electric Company or from Goldschmidt, Inc. A typical functionalized siloxane is an amine functionalized siloxane wherein the functionalization is typically terminal to the siloxane.

Exemplary organosiloxanes are sold under the name Silwet by Witco Corporation. Such organosiloxanes typically have an average weight molecular weight of about 350 to about 15,000, are hydrogen or C1-C4 alkyl capped and may be hydrolyzable or non-hydrolyzable. Typical organosiloxanes include those sold under the name of Silwet L-77, L-7602, L-7604 and L-7605, which are polyalkylene oxide modified dialkyl polysiloxanes.

An example of a suitable anionic dispersant includes (C8-C16) alkylbenzene sulfonate, (C8-C 16) alkane sulfonate, (C8-C18) α-olefin sulfonate, α-sulfo (C8-C16) fatty acid methyl ester, (C8-C16) fatty alcohol sulfate, mono- or di-alkyl sulfosuccinate with each alkyl independently being a (C8-C16) alkyl group, alkyl ether sulfate, a (C8-C16) salt of carboxylic acid or isothionate having a fatty chain of about 8 to about 18 carbons, for example, sodium diethylhexyl sulfosuccinate, sodium methyl benzene sulfonate, or sodium bis (2-ethylhexyl) sulfosuccinate (for example, Aerosol OT or AOT).

Typical, the dispersant is a compound selected from an organosiloxane, a functionalized organosiloxane, an alkyl-substituted pyrrolidone, a polyoxyalkylene ether, or a ethyleneoxide propyleneoxide block copolymer.

An example of a commercial dispersant includes a cyclic organo-silicone (e.g., SF1204, SF1256, SF1328, SF1202 (decamethyl-cyclopentasiloxane(pentamer)), SF1258, SF1528, Dow Corning 245 fluids, Dow Corning 246 fluids, dodecamethyl-cyclo-hexasiloxane (heximer), or SF1173); a copolymer of a polydimethylsiloxane and a polyoxyalkylene oxide (e.g., SF1488 or SF1288); linear silicon comprising oligomers (e.g., Dow Corning 200 (R) fluids); Silwet L-7200, Silwet L-7600, Silwet L-7602, Silwet L-7605, Silwet L-7608, or Silwet L-7622; a nonionic surfactants (e.g., Triton X-100, Igepal CO-630, PVP series, Airvol 125, Airvol 305, Airvol 502, or Airvol 205); an organic polyether (e.g., Surfynol 420, Surfynol 440, or Surfynol 465); or Solsperse 41000.

Another exemplary commercial dispersant includes SF1173 (from GE Silicones); an organic polyether like Surfynol 420, Surfynol 440, or Surfynol 465 (from Air Products Inc); Silwet L-7200, Silwet L-7600, Silwet L-7602, Silwet L-7605, Silwet L-7608, or Silwet L-7622 (from Witco) or non-ionic surfactant such as Triton X-100 (from Dow Chemicals), Igepal CO-630 (from Rhodia), PVP series (from ISP Technologies), or Solsperse 41000 (from Avecia).

The amount of dispersant may range from 0.0 wt % to 5.0 wt %. More typically, the amount of dispersant is between 0.1 wt % and 2.0 wt %. The silanes are typically used in concentrations from 40.0 mol % to 200.0 mol % and, particularly, 60.0 mol % to 150.0 mol % relative to the molecular quantity surface active sites on the surface of a nano-sized particulate filler. Generally, the coating formulation includes not greater than about 5.0 wt % dispersant, such as about 0.1 wt % to about 5.0 wt % dispersant, based on the total weight of the coating formulation. Alternatively, the coating formulation may be free of dispersant.

The coating formulation may further include a dispersed phase suspended in an external phase. The external phase typically includes the polymer constituents. The dispersed phase generally includes particulate filler. The particulate filler may be formed of inorganic particles, such as particles, for example, of a metal (such as, for example, steel, silver, or gold) or a metal complex such as, for example, a metal oxide, a metal hydroxide, a metal sulfide, a metal halogen complex, a metal carbide, a metal phosphate, an inorganic salt (like, for example, $CaCO_3$), a ceramic, or any combination thereof. An example of a metal oxide is ZnO, CdO, $SiO_2$, $TiO_2$, $ZrO_2$, $CeO_2$, $SnO_2$, $MoO_3$, $WO_3$, $Al_2O_3$, $In_2O_3$, $La_2O_3$, $Fe_2O_3$, CuO, $Ta_2O_5$, $Sb_2O_3$, $Sb_2O_5$, or any combination thereof. A mixed oxide containing different metals may also be present. The nanoparticles may include, for example, particles selected from the group consisting of ZnO, $SiO_2$, $TiO_2$, $ZrO_2$, $SnO_2$, $Al_2O_3$, co-formed silica alumina, or any mixture thereof. The nanometer sized particles may also have an organic component, such as, for example, carbon black, a highly crosslinked/core shell polymer nanoparticle, an organically modified nanometer-size particle, etc. Such fillers are described in, for example, U.S. Pat. No. 6,467,897 and WO 98/51747, hereby incorporated by reference.

Particulate filler formed via solution-based processes, such as sol-formed and sol-gel formed ceramics, are particularly well suited for use in forming composite binder. Suitable sols are commercially available. For example, colloidal silicas in aqueous solutions are commercially available under such trade designations as "LUDOX" (E.I. DuPont de Nemours and Co., Inc. Wilmington, Del.), "NYACOL" (Nyacol Co., Ashland, Ma.) and "NALCO" (Nalco Chemical Co., Oak Brook, Ill.). Many commercially available sols are basic, being stabilized by alkali, such as sodium hydroxide, potassium hydroxide, or ammonium hydroxide. Additional examples of suitable colloidal silicas are described in U.S. Pat. No. 5,126,394, incorporated herein by reference. Especially well-suited are sol-formed silica and sol-formed alumina. The sols can be functionalized by reacting one or more appropriate surface-treatment agents with the inorganic oxide particles in the sol.

In a particular embodiment, the particulate filler is sub-micron sized. For example, the particulate filler may be a nano-sized particulate filler, such as a particulate filler having an average particle size of about 3 nm to about 500 nm. In an exemplary embodiment, the particulate filler has an average particle size about 3 nm to about 200 nm, such as about 3 nm to about 100 nm, about 3 nm to about 50 nm, about 8 nm to about 30 nm, or about 10 nm to about 25 nm. In particular embodiments, the average particle size is not greater than about 500 nm, such as not greater than about 200 nm, less than about 100 nm, or not greater than about 50 nm. For the particulate filler, the average particle size may be defined as the particle size corresponding to the peak volume fraction in a small-angle neutron scattering (SANS) distribution curve or the particle size corresponding to 0.5 cumulative volume fraction of the SANS distribution curve.

The particulate filler may also be characterized by a narrow distribution curve having a half-width not greater than about 2.0 times the average particle size. For example, the half-width may be not greater than about 1.5 or not greater than about 1.0. The half-width of the distribution is the width of the distribution curve at half its maximum height, such as half of the particle fraction at the distribution curve peak. In a particular embodiment, the particle size distribution curve is mono-modal. In an alternative embodiment, the particle size distribution is bi-modal or has more than one peak in the particle size distribution.

In a particular embodiment, the coating formulation may include at least two particulate fillers. Each of the particulate fillers may be formed of a material selected from the materials described above in relation to the particulate filler. The particulate fillers may be of the same material or of different materials. For example, each of the particulate fillers may be formed of silica. In an alternative example, one filler may be formed of silica and another filler may be formed of alumina. In an example, each of the particulate fillers has a particle size distribution having an average particle size not greater than about 1000 nm, such as not greater than about 500 nm, or less than about 100 nm. In another example, one of the particulate fillers has a particle size distribution having an average particle size not greater than about 1000 nm, such as not greater than about 500 nm, or less than about 100 nm, while a second particulate filler has an average particle size greater than about 1 micron, such as about 1 micron to about 10 microns, or about 1 micron to about 5 microns. Alternatively, the second particulate filler may have an average particle size as high as 1500 microns. In a particular embodiment, a coating formulation including a first particulate filler having a submicron average particle size and a second particulate filler having an average particle size greater than 1 micron advantageously provides improved mechanical properties when cured to form a binder.

Typically, the second particulate filler has a low aspect ratio. For example, the second particulate filler may have an aspect ratio not greater than about 2, such as about 1 or nearly spherical. Generally, the second particulate filler is untreated and not hardened through treatments. In contrast, abrasive grains typically are hardened particulates with an aspect ratio at least about 2 and sharp edges.

When selecting a second particulate filler, settling speed and viscosity are generally considered. As size increases, particulate fillers having a size greater than 1 micron tend to settle faster, yet exhibit less viscosity at higher loading. In addition, refractive index of the particulate filler may be considered. For example, a particulate filler may be selected with a refractive index at least about 1.35. Further, a particulate filler may be selected that does not include basic residue as basic residue may adversely influence polymerization of cationically polymerizing constituents.

The particulate filler is generally dispersed in a coating formulation. Prior to curing, the particulate filler is colloidally dispersed within the binder suspension and forms a colloidal composite binder once cured. For example, the particulate material may be dispersed such that Brownian motion sustains the particulate filler in suspension. In general, the particulate filler is substantially free of particulate agglomerates. For example, the particulate filler may be substantially mono-disperse such that the particulate filler is dispersed as single particles, and in particular examples, has only insignificant particulate agglomeration, if any.

In a particular embodiment, the particles of the particulate filler are substantially spherical. Alternatively, the particles may have a primary aspect ratio greater than 1, such as at least about 2, at least about 3, or at least about 6, wherein the primary aspect ratio is the ratio of the longest dimension to the smallest dimension orthogonal to the longest dimension. The particles may also be characterized by a secondary aspect ratio defined as the ratio of orthogonal dimensions in a plane generally perpendicular to the longest dimension. The particles may be needle-shaped, such as having a primary aspect ratio at least about 2 and a secondary aspect ratio not greater than about 2, such as about 1. Alternatively, the particles may be platelet-shaped, such as having a secondary aspect ratio at least about 2.

In an exemplary embodiment, the particulate filler is prepared in an aqueous solution and mixed with the coating formulation of the suspension. The process for preparing such suspension includes introducing an aqueous solution, such as an aqueous silica solution; polycondensing the silicate, such as to a particle size of 3 nm to 50 nm; adjusting the resulting silica sol to an alkaline pH; optionally concentrating the sol; mixing the sol with constituents of the external fluid phase of the suspension; and optionally removing water or other solvent constituents from the suspension. For example, an aqueous silicate solution is introduced, such as an alkali metal silicate solution (e.g., a sodium silicate or potassium silicate solution) with a concentration in the range between 20.0% and 50.0% by weight based on the weight of the solution. The silicate is polycondensed to a particle size of 3 nm to 50 nm, for example, by treating the alkali metal silicate solution with acidic ion exchangers. The resulting silica sol is adjusted to an alkaline pH (e.g., pH>8) to stabilize against further polycondensation or agglomeration of existing particles. Optionally, the sol can be concentrated, for example, by distillation, typically to $SiO_2$ concentration of about 30.0% to about 40.0% by weight. The sol is mixed with constituents of the external fluid phase. Thereafter, water or other solvent constituents are removed from the suspension. In a particular embodiment, the suspension is substantially water-free.

An exemplary embodiment of a polymeric constituent including solution formed nano-sized filler includes a filled epoxy constituent, such as Nanopox™, or filled acrylic constituent, such as Nanocryl™, each available from Hans Chemie.

The fraction of the external phase in the pre-cured coating formulation, generally including the organic polymeric constituents, as a proportion of the coating formulation may be about 20.0% to about 95.0% by weight, for example, about 30.0% to about 95.0% by weight, and typically from about 50.0% to about 95.0% by weight, and even more typically from about 55.0% to about 80.0% by weight. The fraction of the dispersed particulate filler phase can be about 5.0% to about 80.0% by weight, for example, about 5.0% to about 70.0% by weight, typically from about 5.0% to about 50.0% by weight, and more typically from about 20.0% to about 45.0% by weight. The colloidally dispersed and submicron particulate fillers described above are particularly useful in concentrations at least about 5.0 wt %, such as at least about 10.0 wt %, at least about 15.0 wt %, at least about 20.0 wt %, or as great as 40.0 wt % or higher. In contrast with traditional fillers, the solution formed nanocomposites exhibit low viscosity and improved processing characteristics at higher loading.

In a particular embodiment, the coating formulation includes about 10.0 wt % to about 90.0 wt % cationically polymerizable compound, not greater than about 40.0 wt % radically polymerizable compound, about 5.0 wt % to about 80.0 wt % particulate filler, and about 10 ppm to about 1.0 wt % of an acid bonding agent, based on the total weight of the coating formulation. It is understood that the sum of the amounts of the coating formulation components adds to 100.0 wt % and, as such, when amounts of one or more components are specified, the amounts of other components correspond so that the sum of the amounts is not greater than 100.0 wt %.

The cationically polymerizable compound, for example, includes an epoxy-functional component or a oxetane-functional component. For example, the coating formulation may include about 10.0 wt % to about 60.0 wt % cationically polymerizable compound, such as about 20.0 wt % to about 50.0 wt % cationically polymerizable compound based on the weight of the coating formulation. In addition, the exemplary coating formulation may include not greater than about 20.0 wt %, such as about 5.0 wt % to about 20.0 wt % mono or poly glycidyl ethers of an aliphatic alcohol, aliphatic polyols, polyesterpolyol or polyetherpolyol. Further, the exemplary coating formulation may include not greater than about 50.0 wt %, such as about 5.0 wt % to about 50.0 wt % of a component having a polyether backbone, such as polytetramethylenediol, glycidylethers of polytetramethylenediol, acrylates of polytetramethylenediol or polytetramethylenediol containing one or more polycarbonate groups.

The radically polymerizable compound of the above example, for example, includes components having one or more methacylate groups, such as components having at least 3 methacrylate groups. In another example, the coating formulation includes not greater than about 30.0 wt %, such as not greater than about 20.0 wt %, not greater than about 10.0 wt %, or not greater than about 5.0 wt % radically polymerizable compound.

The acid bonding agent of the above example may include a fluorinated polyether. For example, the fluorinated polyether may be an acrylic terminated fluorinated polyether. In another example, the fluorinated polyether may be a hydroxyl-terminated polyether. Generally, the fluorinated polyether may include about 5 to about 25 repeating units joined by an ether bond, each repeating unit of the fluorinated polyether including a fluorinated alkoxy group. In particular, the coating formulation may include at least about 10 ppm of the acid bonding agent and generally includes not greater than 1.0 wt % of the acid bonding agent. For example, the coating formulation may include about 10 ppm to about 1000 ppm of the acid bonding agent.

The formulation may further include not greater than about 20.0 wt % cationic photoinitiator, such as about 0.1 wt % to about 20.0 wt %, or not greater than about 20.0 wt % radical photoinitiator, such as about 0.1 wt % to about 20.0 wt % radical photoinitiator. For example, the coating formulation may include not greater than about 10.0 wt %, such as not greater than about 5.0 wt % cationic photoinitiator. In another example, the coating formulation may include not greater than about 10.0 wt %, such as not greater than about 5.0 wt % free radical photoinitiator.

The particulate filler includes dispersed submicron particulates. Generally, the coating formulation includes 5.0 wt % to 80.0 wt %, such as 5.0 wt % to 60.0 wt %, for example, 5.0 wt % to 50.0 wt %, or 20.0 wt % to 45.0 wt % of the submicron particulate filler. Particular embodiments include at least about 5.0 wt % of the particulate filler, such as at least about 10.0 wt %, or at least about 20.0 wt % of the particulate filler. In a particular embodiment, the particulate filler is solution formed silica particulate and may be colloidally dispersed in a polymer component. The exemplary coating formulation may further include not greater than about 5.0 wt % dispersant, such as 0.1 wt % to 5.0 wt % of the dispersant, selected from organosiloxanes, functionalised organosiloxanes, alkyl-substituted pyrrolidones, polyoxyalkylene ethers, or ethyleneoxide propyleneoxide block copolymer.

In a particular embodiment, the coating formulation is formed by mixing a nanocomposite epoxy or acrylate precursor, i.e., a precursor including submicron particulate filler. For example, the coating formulation may include not greater than about 90.0 wt % nanocomposite epoxy and may include acrylic precursor, such as not greater than about 50.0 wt % acrylic precursor. In another example, a nanocomposite acrylic precursor may be mixed with epoxy.

In an exemplary embodiment, the coating formulation may exhibit a desirable Migration Index, defined as the distance of migration of acidic agents from a radiation boundary. The Migration Index is determined in accordance with the method described in the examples below (see Example 1). In general, a coating formulation exhibiting poor migration performance exhibits widespread migration of acid groups in irregular patterns from a radiation boundary and thus, has a large Migration Index. In particular, the coating formulation may exhibit a Migration Index of not greater than about 4.0 mm, such as not greater than about 2.0 mm, or even not greater than about 1.0 mm.

In a further example, the coating, formed after curing the coating formulation, exhibits a Young's modulus of at least about 500 MPa, such as at least about 750 MPa. For example, the coating may exhibit a Young's modulus of at least about 3100 MPa (450 ksi), at least about 4067 MPa (590 ksi), at least about 5615 MPa (815 ksi), at least about 5684 MPa (825 ksi), or at least about 6132 MPa (890 ksi). The coating, after curing, may exhibit an elongation-at-break of at least about 1.0%. For example, the coating may exhibit elongation-at-break of at least about 1.7%, at least about 2.2%, at least about 4.0%, at least about 9.0%, or at least about 11.0%. In a particular example, the coating may exhibit both a Young's modulus of at least about 4065 MPa and an elongation-at-break of at least about 9.0%. In another example, the coating may exhibit a Young's modulus of at least about 3100 MPa and an elongation-at-break of at least about 11.2%. In a further example, the coating exhibits a Young's modulus at least about 5615 MPa and an elongation-at-break at least about 4.0%. The coating, after curing, may further exhibit a tensile strength of at least about 20 MPa, such as at least about 30 MPa, or at least about 40 MPa.

The coating formulation including an external phase comprising polymeric or monomeric constituents and including dispersed particulate filler may be used to form a make coat, a size coat, a compliant coat, or a back coat of a coated abrasive article. In an exemplary process for forming a make coat, the coating formulation is coated on a backing, abrasive grains are applied over the make coat, and the make coat is cured. A size coat may be applied over the make coat and abrasive grains. In another exemplary embodiment, the coating formulation is blended with the abrasive grains to form abrasive slurry that is coated on a backing and cured. Alternatively, the abrasive slurry is applied to a mold, such as injected into a mold and cured to form a bonded abrasive article.

The abrasive grains may be formed of any one of or a combination of abrasive grains, including silica, alumina (fused or sintered), zirconia, zirconia/alumina oxides, silicon carbide, garnet, diamond, cubic boron nitride, silicon nitride, ceria, titanium dioxide, titanium diboride, boron carbide, tin oxide, tungsten carbide, titanium carbide, iron oxide, chromia, flint, emery. For example, the abrasive grains may be selected from a group consisting of silica, alumina, zirconia, silicon carbide, silicon nitride, boron nitride, garnet, diamond, cofused alumina zirconia, ceria, titanium diboride, boron carbide, flint, emery, alumina nitride, and a blend thereof. In a further example, the abrasive grain may be formed of an agglomerate grain, such as an agglomerate grain described in U.S. Pat. No. 6,797,023, which is included herein by reference in its entirety. Particular embodiments have been created by use of dense abrasive grains comprised principally of alpha-alumina.

The abrasive grain may also have a particular shape. An example of such a shape includes a rod, a triangle, a pyramid, a cone, a solid sphere, a hollow sphere, or the like. Alternatively, the abrasive grain may be randomly shaped.

The abrasive grains generally have an average grain size not greater than 2000 microns, such as not greater than about 1500 microns. In another example, the abrasive grain size is not greater than about 750 microns, such as not greater than about 350 microns. For example, the abrasive grain size may be at least 0.1 microns, such as from about 0.1 microns to about 1500 microns, and more typically from about 0.1 microns to about 200 microns, or from about 1 micron to about 100 microns. The grain size of the abrasive grains is typically specified to be the longest dimension of the abrasive grain. Generally, there is a range distribution of grain sizes. In some instances, the grain size distribution is tightly controlled.

In a blended abrasive slurry including the abrasive grains and the coating formulation, the abrasive grains provide from about 10% to about 90%, such as from about 30% to about 80%, of the weight of the abrasive slurry.

The abrasive slurry may further include a grinding aid to increase the grinding efficiency and cut rate. A useful grinding aid can be inorganic based, such as a halide salt, for example, sodium cryolite, and potassium tetrafluoroborate; or organic based, such as a chlorinated wax, for example, polyvinyl chloride. A particular embodiment includes cryolite and potassium tetrafluoroborate with particle size ranging from 1 micron to 80 microns, and most typically from 5 microns to 30 microns. The weight percent of grinding aid is generally not greater than about 50.0 wt %, such as from about 0.0 wt % to 50.0 wt %, and most typically from about 10.0 wt % to 30.0 wt % of the entire slurry (including the abrasive grains).

In particular, the coating formulation including the polymerizable component and the acid bonding agent may be used to form an abrasive article, such as a coated abrasive article (including an engineered or structured abrasive article) or a bonded abrasive article. When forming a coated abrasive article, the coating formulation may be used as a binder formulation cured to bind abrasive grains to a backing, or may be used to form a backsize layer.

Figure 1:
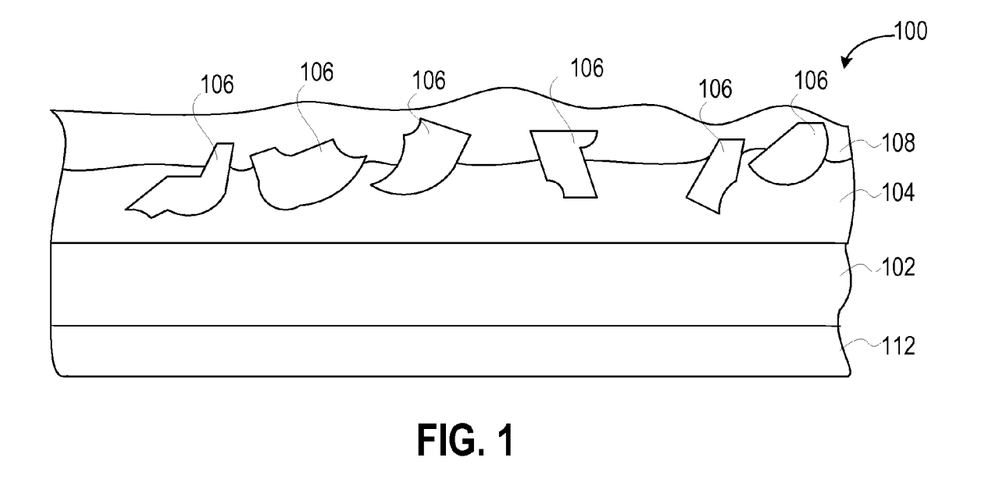
FIG. 1 includes an illustration of an exemplary coated abrasive article.

FIG. 1 illustrates an exemplary embodiment of a coated abrasive article 100, which includes abrasive grains 106 secured to a backing or support member 102. Generally, the abrasive grains 106 are secured to the backing 102 by a make coat 104. The make coat 104 includes a binder, which is typically formed of a cured coating formulation.

The coated abrasive article 100 may further include a size coat 108 overlying the make coat 104 and the abrasive grains 106. The size coat 108 generally functions to further secure the abrasive grains 106 to the backing 102 and may also provide grinding aids. The size coat 108 is generally formed from a cured coating formulation that may be the same as or different from the make coat coating formulation.

The coated abrasive 100, optionally, also may include a back coat 112. The back coat 112 functions as an anti-static layer, preventing abrasive grains from adhering to the back side of the backing 102 and preventing swarf from accumulating charge during sanding. In another example, the back coat 112 may provide additional strength to the backing 102 and may act to protect the backing 102 from environmental exposure. In another example, the coated abrasive 100 may include a compliant layer (not shown) to relieve stress between the make coat 104 and the backing 102. The back coat 112 or a compliant layer may be formed from a coating formulation including an acid bonding agent.

The backing 102 may be flexible or rigid. The backing 102 may be made of any number of various materials including those conventionally used as backings in the manufacture of coated abrasives. An exemplary flexible backing includes a polymeric film (including primed films), such as a polyolefin film (e.g., polypropylene including biaxially oriented polypropylene), a polyester film (e.g., polyethylene terephthalate), a polyamide film, a cellulose ester film, a metal foil, a mesh, a foam (e.g., natural sponge material or polyurethane foam), a cloth (e.g., cloth made from fibers or yarns comprising polyester, nylon, silk, cotton, poly-cotton or rayon), a paper, a vulcanized paper, a vulcanized rubber, a vulcanized fiber, a nonwoven material, or combinations thereof, or treated versions thereof. A cloth backing may be woven or stitch bonded. In particular examples, the backing 102 is selected from a group consisting of paper, polymer film, cloth, cotton, poly-cotton, rayon, polyester, poly-nylon, vulcanized rubber, vulcanized fiber, metal foil and a combination thereof. In other examples, the backing 102 includes a thermoplastic polymeric film, such as a polypropylene film or a polyethylene terephthalate (PET) film.

The backing 102 may optionally have at least one of a saturant or a presize layer. The purpose of these layers is typically to seal the backing 102 or to protect yarn or fibers in the backing 102. If the backing 102 is a cloth material, at least one of these layers is typically used.

An antistatic material may be included in cloth treatment materials. The addition of an antistatic material can reduce the tendency of the coated abrasive article to accumulate static electricity when sanding wood or wood-like materials. Additional details regarding antistatic backings and backing treatments can be found in, for example, U.S. Pat. Nos. 5,108,463 (Buchanan et al.); 5,137,542 (Buchanan et al.); 5,328,716 (Buchanan); and 5,560,753 (Buchanan et al.), the disclosures of which are incorporated herein by reference.

The backing 102 may be a fibrous reinforced thermoplastic such as described, for example, in U.S. Pat. No. 5,417,726 (Stout et al.), or an endless spliceless belt, as described, for example, in U.S. Pat. No. 5,573,619 (Benedict et al.), the disclosures of which are incorporated herein by reference. Likewise, the backing 102 may be a polymeric substrate having hooking stems projecting therefrom such as that described, for example, in U.S. Pat. No. 5,505,747 (Chesley et al.), the disclosure of which is incorporated herein by reference. Similarly, the backing 102 may be a loop fabric such as that described, for example, in U.S. Pat. No. 5,565,011 (Follett et al.), the disclosure of which is incorporated herein by reference. Further, the backing 102 may be a nonwoven material.

In another example, a pressure-sensitive adhesive is incorporated onto the back side of the coated abrasive article such that the resulting coated abrasive article can be secured to a pad. An exemplary pressure-sensitive adhesive includes latex crepe, rosin, acrylic polymer or copolymer including polyacrylate ester (e.g., poly(butyl acrylate)), vinyl ether (e.g., poly(vinyl n-butyl ether)), alkyd adhesive, rubber adhesive (e.g., natural rubber, synthetic rubber, and chlorinated rubber), or a mixture thereof.

An exemplary rigid backing includes metal plate, ceramic plate, or the like. Another example of a suitable rigid backing is described, for example, in U.S. Pat. No. 5,417,726 (Stout et al.), the disclosure of which is incorporated herein by reference.

Figure 2:
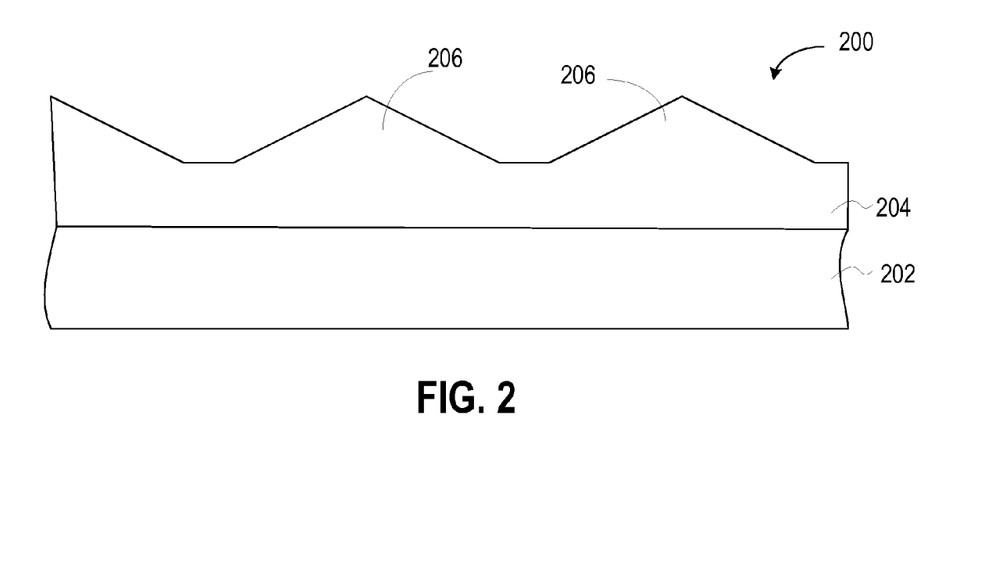
FIG. 2 includes an illustration of an exemplary structured or engineered abrasive article.
Figure 3:
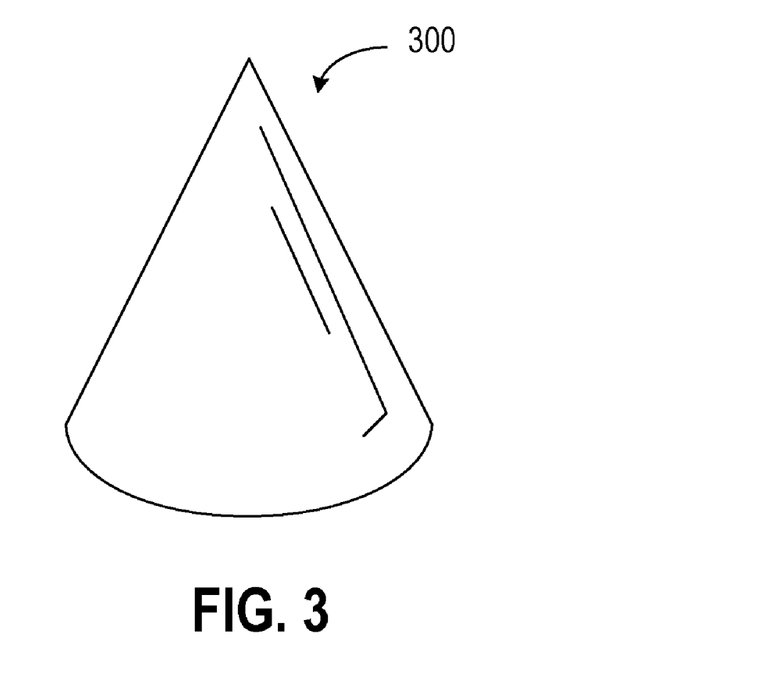
FIG. 3 includes an illustration of an exemplary bonded abrasive article.

In a particular embodiment, an abrasive article, such as the coated abrasive illustrated in FIG. 1 and FIG. 2 and bonded abrasive illustrated in FIG. 3, may be formed using a coating formulation including an acid bonding agent. For example, a method of forming an abrasive article may include preparing a formulation including a cationically polymerizable component, a cationic agent, and an acid bonding agent. The method further may include forming a work piece including the formulation and abrasive grains and curing the formulation.

Coated abrasive articles, such as the coated abrasive article 100 of FIG. 1, may be formed by coating a backing with a coating formulation or abrasive slurry. Optionally, the backing may be coated with a compliant coat prior to coating with the make coat. Typically, the coating formulation is applied to the backing to form the make coat. In an embodiment, the abrasive grains are applied with the coating formulation, wherein the abrasive grains are blended with the coating formulation to form abrasive slurry prior to application to the backing. Alternatively, the coating formulation is applied to the backing to form the make coat and the abrasive grains are applied to the make coat, such as through electrostatic and pneumatic methods. The coating formulation is cured such as through thermal methods or exposure to actinic radiation.

Optionally, a size coat is applied over the make coat and abrasive grains. The size coat may be applied prior to curing the make coat, the make coat and size coat being cured simultaneously. Alternatively, the make coat is cured prior to application of the size coat and the size coat is cured separately.

The coating formulation forming the make coat, the size coat, the compliant coat, or the back coat may include colloidal coating formulation and an acid bonding agent. The colloidal coating formulation may include sub-micron particulate filler, such as nano-sized particulate filler having a narrow particle size distribution and may include the acid bonding agent. In a particular embodiment, the colloidal coating formulation is cured to form the size coat. In another embodiment, the colloidal coating formulation is cured to form the make coat. Alternatively, the colloidal coating formulation may be cured to form the optional compliant coat or the optional back coat.

In particular embodiments, the coats and abrasive grains may be patterned to form structures. For example, the make coat may be patterned to form surface structures that enhance abrasive article performance. Patterns may be pressed or rolled into the coats using, for example, a rotogravure apparatus to form a structured or engineered abrasive article.

An exemplary embodiment of an engineered or structured abrasive is illustrated in FIG. 2. Structured abrasives are coated abrasives including shaped structures disposed on a backing. The structured abrasive includes a backing 202 and a layer 204 including abrasive grains. The backing 202 may be formed of the materials described above in relation to the backing 102 of FIG. 1. Generally, the layer 204 is patterned to have surface structures 206.

The layer 204 may be formed as one or more coats. For example, the layer 204 may include a make coat and optionally a size coat. The layer 204 generally includes abrasive grains and a binder. In one exemplary embodiment, the abrasive grains are blended with the coating formulation to form abrasive slurry. Alternatively, the abrasive grains are applied to the coating formulation after the coating formulation is coated on the backing 202. Optionally, a functional powder may be applied over the layer 204 to prevent the layer 204 from sticking to the patterning tooling.

The binder of the make coat or the size coat may be a colloidal coating formulation, wherein the formulation that is cured to form the binder is a colloidal suspension including particulate filler and an acid bonding agent. Alternatively, or in addition, the binder is a nanocomposite binder including sub-micron particulate filler. The structured abrasive article 200 may optionally include compliant and back coats (not shown). These coats may function as described above.

In a further example, colloidal formulations may be used to form bonded abrasive articles, such as the abrasive article 300 illustrated in FIG. 3. In a particular embodiment, colloidal formulation and abrasive grains are blended to form abrasive slurry. The abrasive slurry is applied to a mold and the colloidal formulation is cured. The resulting abrasive article, such as article 300, includes the abrasive grains bound by nano-composite binder in a desired shape.

In a particular embodiment, the abrasive article is formed by blending nanocomposite precursors and acid bonding agents with other polymeric precursors and constituents. For example, a nanocomposite epoxy precursor including nano-sized particulate filler and epoxy precursors is mixed with acrylic precursors and an acid bonding agent to form a nanocomposite coating formulation. The coating formulation is applied to a substrate, such as a backing or to a mold. Abrasive grains are also applied to the substrate and the coating formulation is cured.

When the nanocomposite binder forms a make coat for a coated abrasive article, the nanocomposite coating formulation may be applied to a backing and abrasive grains applied over the formulation. Alternatively, the coating formulation may be applied over the abrasive grains to form a size coat. In another example, the coating formulation and the abrasive grains may be blended and applied simultaneously to form a make coat over a substrate or to fill a mold. Generally, the coating formulation may be cured using thermal energy or actinic radiation, such as ultraviolet radiation.

Embodiments of the above described coating formulation, binder, coatings, abrasive articles, and methods for forming same are particularly advantageous. For example, abrasive articles formed of coating formulations described above may exhibit low acid migration and in particular, low equipment wear. For example, embodiments of the coating formulation when used in a process for manufacturing an abrasive article restrict movement of corrosive byproducts and reduce process equipment corrosion. In particular, low wear and corrosion of process equipment lead to longer equipment life, and, thus, reducing product costs.

EXAMPLE

Example 1

Sample coating formulations are prepared for testing Migration Index. Each sample coating formulation includes 80 parts of an epoxy constituent (Nanopox A610 available from Hanse Chemie, Berlin), 20 parts of an oxetane component, OXT-212 (3-ethyl-3-(2-ethylhexyloxymethyl)oxetane), 0.02 parts of a latent colorant Copikem 20 available from Noveon Hilton Davis, Inc., of Cincinnati, Ohio, and 5.9 parts Chivacure 1176. In addition, each sample includes 0.008 parts of an acid bonding agent selected from one of PF-6520, PF-3320, AT-1128, or AT-1063, each available from Omnova Solutions, Inc. of Akron, Ohio. A comparative sample is prepared without an acid bonding agent and two comparative samples are prepared using Novec FC-4430 and FC-4432, available from 3M, in place of the acid bonding agent.

A layer of the coating formulation is poured into a Petri dish. The Petri dish is covered with an aluminum foil top containing a small rectangle slot that permits electromagnetic radiation, typically in a range of UV to IR electromagnetic radiation, to penetrate through the slot while shading the remainder of the Petri dish. The Petri dish has a diameter of 60 mm and the slot has a length of 40 mm and a width of 10 mm. The coating formulation is cured by exposure to a 150 W D bulb at a line speed 75 ft/min.

Figure 4:
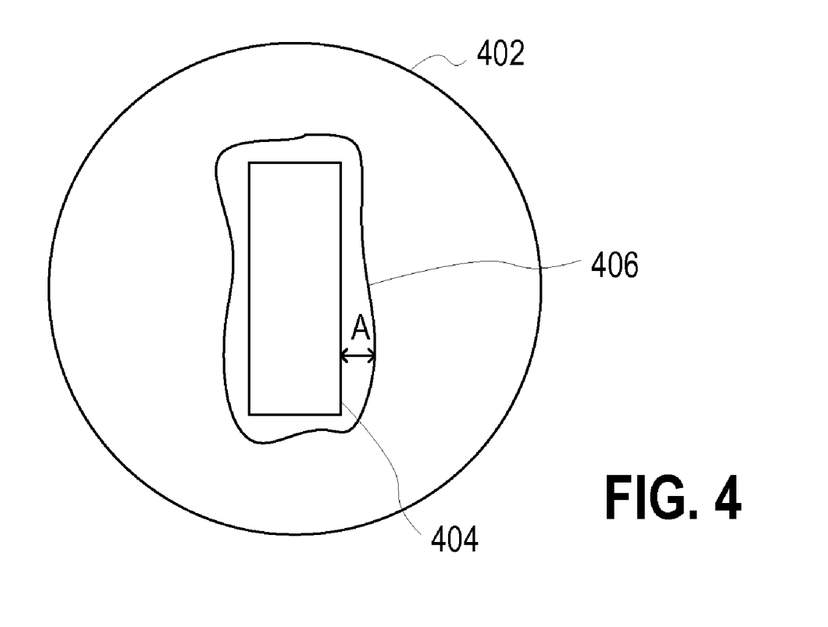
FIG. 4 includes an illustration of an exemplary test piece used in determining a Migration Index.

In general, in response to the exposure, cationic photopolymerization is exhibited in those areas that are exposed, while polymerization is limited in areas shadowed by the aluminum foil. In particular, the acid bonding agent is believed to bind cationic species, reducing the migration of such species and thus limiting the polymerization to regions close to and within exposed areas. As illustrated in FIG. 4, a region 404 of the coating formulation 402 polymerizes as a result of exposure through the slot in the aluminum foil. In addition, migration of cationic agents can polymerize a region 406 around or outside of the exposed region 404. The Migration Index is a measure of the maximum distance "A" of cationic agent diffusion from the exposed region 404 as indicated by the change and coloration of the latent colorant.

As illustrated in Table 1, Migration Index of those samples (1.1 to 1.4) including an acid bonding agent is not greater than about 2.0, while comparative sample 1.5 without acid bonding agent exhibits excessive diffusion covering a large portion of the Petri dish. Similar to sample 1.5, the comparative samples including Novec FC-4430 or FC-4432 (not listed in Table 1) exhibit excessive diffusion covering a large portion of the Petri dish.

TABLE 1

Migration Index of Sample Formulations

| INGREDIENT | 1.1 parts | 1.2 parts | 1.3 parts | 1.4 parts | 1.5 parts |
|---|---|---|---|---|---|
| Nanopox A610 | 80 | 80 | 80 | 80 | 80 |
| OXT-212 | 20 | 20 | 20 | 20 | 20 |
| Copikem 20 | 0.02 | 0.02 | 0.02 | 0.02 | 0.02 |
| Chivacure 1176 | 5.9 | 5.9 | 5.9 | 5.9 | 5.9 |
| PF-6520 | 0.008 | | | | |
| PF-3320 | | 0.008 | | | |
| AT-1128 | | | 0.008 | | |
| AT-1063 | | | | 0.008 | |
| Migration Index (mm) | 1.2 | 1.7 | 1.5 | 1.8 | Acid diffusion in the solution |

Example 2

Samples are prepared as described above with the exception that varying amounts of acid bonding agent are added to the formulation. In particular, one of two acid bonding agents, PF-3320 and AT-1063 available from Omnova Solutions, Inc. are included in the coating formulation in amounts of 0.008 parts, 0.016 parts, and 0.024 parts. As illustrated in Table 2, the Migration Index for the samples including PF-3320 improves with increased concentration of the acid bonding agent. In particular, Sample 2.3 exhibits a Migration Index not greater than 1.0.

TABLE 2

Effect of Acid bonding agent Concentration of Migration Index

| INGREDIENT | 2.1 parts | 2.2 parts | 2.3 parts | 2.4 parts | 2.5 parts | 2.6 parts |
|---|---|---|---|---|---|---|
| Nanopox A610 | 80 | 80 | 80 | 80 | 80 | 80 |
| OXT-212 | 20 | 20 | 20 | 20 | 20 | 20 |
| Copikem 20 | 0.02 | 0.02 | 0.02 | 0.02 | 0.02 | 0.02 |
| Chivacure 1176 | 5.9 | 5.9 | 5.9 | 5.9 | 5.9 | 5.9 |
| PF-3320 | 0.008 | 0.016 | 0.024 | | | |
| AT-1063 | | | | 0.008 | 0.016 | 0.024 |
| Migration Index (mm) | 1.7 | 1.2 | 0.9 | 1.8 | 2.2 | 3 |

Example 3

In another example, the coating formulations include one polyol selected from the group consisting of Terathane 250, Terathane 1000, 4,8-bis(hydroxymethyl) tricyclo(5.2.1.0)decane, 2-ethyl-1,3-hexanediol, and 1,5-pentanediol. The selected polyol is mixed with Nanopox XP 22/0314, Irgacure 2022, Chivacure 1176, and Nanocryl XP 21/0940. Nanocryl XP 21/0940 is an acrylate precursor (tetraacrylate) including 50 wt % colloidal silica particulate filler, available from Hanse Chemie, Berlin. In addition the formulation includes PolyFox® PF-3320. The concentrations are illustrated in TABLE 3.

TABLE 3

Example Coating Formulations

| INGREDIENT | 3.1 Wt % | 3.2 Wt % | 3.3 Wt % | 3.4 Wt % | 3.5 Wt % |
|---|---|---|---|---|---|
| Nanopox XP 22/0314 | 74.46 | 74.46 | 74.46 | 74.46 | 74.46 |
| Irgacure 2022 | 0.48 | 0.48 | 0.48 | 0.48 | 0.48 |
| Chivacure 1176 | 1.50 | 1.50 | 1.50 | 1.50 | 1.50 |
| Nanocryl XP 21/0940 | 11.06 | 11.06 | 11.06 | 11.06 | 11.06 |
| PF-3320 | 0.01 | 0.01 | 0.01 | 0.01 | 0.01 |
| Terathane 250 | 12.49 | | | | |
| Terathane 1000 | | 12.49 | | | |
| 4,8-bis(hydroxymethyl) tricyclo(5.2.1.0)decane | | | 12.49 | | |
| 2-ethyl-1,3-hexanediol | | | | 12.49 | |
| 1,5-pentanediol | | | | | 12.49 |
| EVALUATION | | | | | |
| Filler % | 35.32 | 35.32 | 35.32 | 35.32 | 35.32 |
| Tg (tan delta, ° C.) | 84.25 | 116.55 | 139.8 | 93.6 | 53.85 |
| E' at 23° C. (MPa) | 2374.5 | 2591.5 | 3258 | 2819.5 | 1992 |

The samples each exhibit a desirable glass transition temperature. In addition, the samples exhibit a desirable elastic or Young's modulus. For example, the samples exhibit an elastic modulus of at least about 1990 MPa, and particular samples exhibit an elastic modulus of at least about 2500 MPa, or even 3200 MPa.

Example 4

In another example, a sample a coating formulation illustrated in Table 4 includes both nano-sized filler particles supplied through the addition of Nanopox A 610 and micronsized fillers (NP-30 and ATH S-3) having an approximate average particle size of 3 microns. NP-30 includes spherical silica particles having an average particle size of about 3 micron. ATH S-3 includes non-spherical alumina anhydride particles having an average particle size of about 3 microns. In addition, the binder formulation includes PolyFox® PF-3320. The sample has a Young's modulus of 8.9 GPa (1300 ksi), a tensile strength of 77.2 MPa (11.2 ksi), and an elongation at break of 1%.

TABLE 4

Example Coating Formulation

| INGREDIENT | Wt. % |
|---|---|
| UVR-6105 | 0.71 |
| Heloxy 67 | 6.50 |
| SR-351 | 2.91 |
| DPHA | 1.80 |
| (3-glycidoxypropyl) trimethoxysilane | 1.17 |
| Chivacure 184 | 0.78 |
| NP-30 | 46.71 |
| ATH S-3 | 7.78 |
| Nanopox A 610 | 27.75 |
| Chivacure 1176 | 3.89 |
| SDA 5688 | 0.00072 |
| PF-3320 | 0.008 |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An abrasive article comprising:
   a binder formed from a formulation including a polymer component, a curing agent, and an acid bonding agent; and
   abrasive grains,
   wherein the acid bonding agent is a fluorinated polyether including an acrylic terminated fluorinated polyether or a hydroxy terminated fluorinated polyether.

2. The abrasive article of claim 1, wherein the formulation includes about 10 ppm to about 1.0 wt % of the acid bonding agent.

3. The abrasive article of claim 1, wherein the fluorinated polyether includes about 5 to about 25 repeating units.

4. The abrasive article of claim 3, wherein each repeating unit of the fluorinated polyether includes a fluorinated alkoxy group.

5. The abrasive article of claim 1, wherein the formulation includes about 10.0 wt % to about 90.0 wt % of the polymer component.

6. The abrasive article of claim 1, wherein the polymer component includes a cationically polymerizable component.

7. The abrasive article of claim 6, wherein the cationically polymerizable component includes an epoxy component or an oxetane component.

8. The abrasive article of claim 1, wherein the formulation further includes not greater than about 40.0 wt % of a radically polymerizable component.

9. The abrasive article of claim 8, wherein the radically polymerizable component includes an acrylic component.

10. The abrasive article of claim 1, wherein the formulation further includes a nano-sized filler having an average particle size of about 3 nm to about 200 nm.

11. The abrasive article of claim 1, wherein the formulation has a Migration Index of not greater than about 4 mm.

12. An abrasive article comprising:
   a binder formed from a formulation including a cationically polymerizable component, a cationic catalytic agent, and an acid bonding agent, wherein the acid bonding agent is a fluorinated polyether including an acrylic terminated fluorinated polyether or a hydroxy terminated fluorinated polyether; and
   abrasive grains.

13. The abrasive article of claim 12, wherein the formulation includes about 10 ppm to about 1.0 wt % of the acid bonding agent.

14. The abrasive article of claim 12, wherein the acid bonding agent includes a fluorinated polyether.

15. The abrasive article of claim 12, wherein the formulation includes about 10.0 wt % to about 90.0 wt % of the cationically polymerizable component.

16. The abrasive article of claim 12, wherein the formulation has a Migration Index not greater than about 4 mm.

17. A method of forming an abrasive article, the method comprising:
   preparing a formulation including a cationically polymerizable component, a cationic catalytic agent, and an acid bonding agent, wherein the acid bonding agent is a fluorinated polyether including an acrylic terminated fluorinated polyether or a hydroxy terminated fluorinated polyether;

forming the abrasive article including the formulation and abrasive grains; and curing the formulation.

18. The method of claim 17, wherein forming the abrasive article include coating the formulation on a backing.

19. The method of claim 17, wherein the cationic catalytic agent included a cationic photoinitiator, wherein curing the formulation includes irradiating the abrasive article.

* * * * *